United States Patent
Rieling et al.

(10) Patent No.: US 8,825,244 B2
(45) Date of Patent: Sep. 2, 2014

(54) METHOD AND APPARATUS FOR OPERATING A HYBRID VEHICLE

(75) Inventors: Jörg Rieling, Braunschweig (DE); Andreas Boy, Wolfsburg (DE); Marko Wollenberg, Cremlingen (DE)

(73) Assignee: Volkswagen AG, Wolfsburg (DE)

( * ) Notice: Subject to any disclaimer, the term of this patent is extended or adjusted under 35 U.S.C. 154(b) by 466 days.

(21) Appl. No.: 12/809,679

(22) PCT Filed: Dec. 18, 2008

(86) PCT No.: PCT/EP2008/010798
§ 371 (c)(1),
(2), (4) Date: Sep. 13, 2010

(87) PCT Pub. No.: WO2009/080277
PCT Pub. Date: Jul. 2, 2009

(65) Prior Publication Data
US 2010/0332064 A1    Dec. 30, 2010

(30) Foreign Application Priority Data
Dec. 20, 2007 (DE) .......... 10 2007 061 546

(51) Int. Cl.
B60W 20/00 (2006.01)
B60K 6/365 (2007.10)
B60K 6/547 (2007.10)
B60W 10/06 (2006.01)
B60K 6/48 (2007.10)
B60W 10/08 (2006.01)
B60K 28/04 (2006.01)

(52) U.S. Cl.
CPC .......... *B60W 20/00* (2013.01); *B60W 2540/16* (2013.01); *Y02T 10/54* (2013.01); *Y02T 10/6221* (2013.01); *B60W 2540/12* (2013.01); *B60K 6/365* (2013.01); *B60K 6/547* (2013.01); *B60W 10/06* (2013.01); *B60K 6/48* (2013.01); *B60L 2240/486* (2013.01); *Y02T 10/6286* (2013.01); *B60W 10/08* (2013.01); *B60K 28/04* (2013.01)
USPC ........... 701/22; 701/113; 180/65.28; 180/272

(58) Field of Classification Search
CPC ....... B60K 28/02; B60K 28/04; B60W 10/04; B60W 10/06; B60W 10/08; B60W 20/00; B60W 40/08; B60W 40/09; B60W 2540/00; Y02T 10/6221; Y02T 10/6286
USPC ..................... 701/22, 36, 101, 102, 112, 113; 180/65.1, 65.21, 65.28, 271–273
See application file for complete search history.

(56) References Cited

U.S. PATENT DOCUMENTS 6,504,259 B1 *   1/2003  Kuroda et al. .............. 290/40 C
6,575,257 B1 *   6/2003  Ikkai et al. .................. 180/65.8

(Continued)

FOREIGN PATENT DOCUMENTS

CN    1792692 A    6/2006  ............ B60K 6/485
DE    10211466    *  8/2003

(Continued)

OTHER PUBLICATIONS

International Search Report and Written Opinion for Application No. PCT/EP2008/010798 (10 pages), Feb. 18, 2010.

*Primary Examiner* — Thomas Black
*Assistant Examiner* — Ce Li
(74) *Attorney, Agent, or Firm* — King & Spalding L.L.P.

(57) ABSTRACT

In a method and an apparatus (9) for operating a hybrid vehicle with an internal combustion engine (4) and an electric motor (5), the internal combustion engine (4) is started automatically in a readiness to drive mode of the hybrid vehicle (1) as soon as it is no longer detected reliably that the driver is present.

12 Claims, 1 Drawing Sheet

(56) References Cited

U.S. PATENT DOCUMENTS

| | | | |
|---|---|---|---|
| 6,751,534 B2* | 6/2004 | Robichaux et al. | 701/22 |
| 6,853,895 B2* | 2/2005 | Javaherian | 701/36 |
| 7,079,942 B2* | 7/2006 | McGee et al. | 701/113 |
| 7,111,615 B2* | 9/2006 | Tanaka et al. | 123/491 |
| 7,280,908 B2* | 10/2007 | Maehara et al. | 701/113 |
| 7,322,331 B2* | 1/2008 | Tamagawa et al. | 123/179.3 |
| 7,559,387 B2* | 7/2009 | Tamai | 180/65.285 |
| 7,657,362 B2* | 2/2010 | Ando et al. | 701/106 |
| 7,657,366 B2* | 2/2010 | Guy et al. | 701/112 |
| 8,193,922 B2* | 6/2012 | Steinle et al. | 340/436 |
| 8,494,701 B2* | 7/2013 | Philipp et al. | 701/22 |
| 2002/0082754 A1* | 6/2002 | Robichaux et al. | 701/22 |
| 2005/0256632 A1* | 11/2005 | McGee et al. | 701/101 |
| 2006/0085120 A1* | 4/2006 | McGee et al. | 701/113 |
| 2006/0131085 A1* | 6/2006 | Tamai | 180/65.2 |
| 2006/0169504 A1* | 8/2006 | Oliver et al. | 180/65.2 |
| 2007/0200424 A1* | 8/2007 | Sakai | 303/3 |
| 2007/0267238 A1* | 11/2007 | Guy et al. | 180/272 |
| 2008/0186157 A1* | 8/2008 | Steinle et al. | 340/453 |
| 2008/0275626 A1* | 11/2008 | Ando et al. | 701/106 |
| 2009/0105038 A1* | 4/2009 | Weiss et al. | 477/5 |
| 2009/0319161 A1* | 12/2009 | Abendroth | 701/112 |
| 2010/0312426 A1* | 12/2010 | Philipp et al. | 701/22 |
| 2011/0187521 A1* | 8/2011 | Beruscha et al. | 340/441 |

FOREIGN PATENT DOCUMENTS

| | | | |
|---|---|---|---|
| DE | 102007010491 | 9/2008 | B60K 28/10 |
| WO | 2006027514 | 3/2006 | F02N 11/08 |
| WO | 2007031169 | 3/2007 | B60W 30/16 |

* cited by examiner

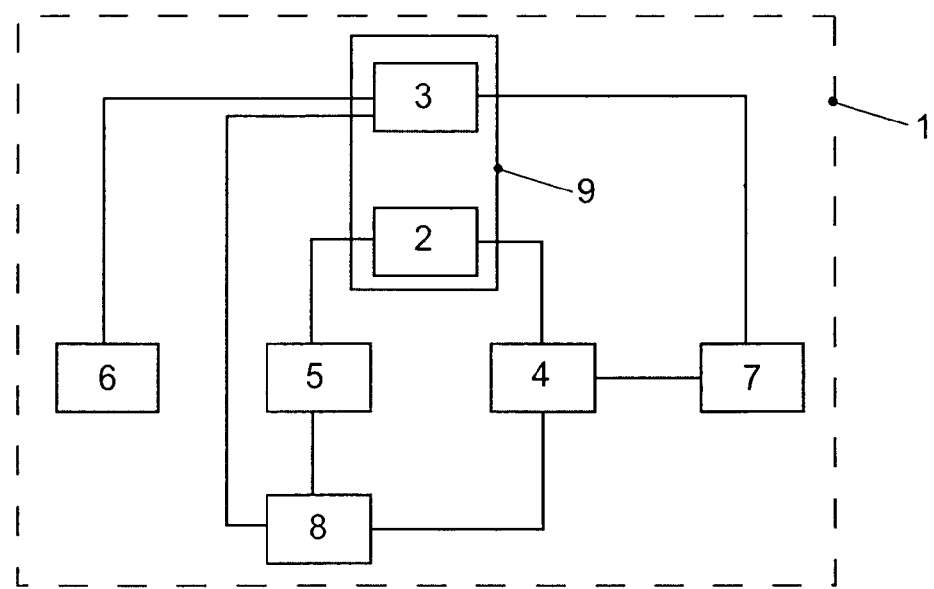

METHOD AND APPARATUS FOR OPERATING A HYBRID VEHICLE

CROSS-REFERENCE TO RELATED APPLICATIONS

This application is a U.S. National Stage Application of International Application No. PCT/EP2008/010798 filed Dec. 18, 2008, which designates the United States of America, and claims priority to German Application No. 10 2007 061 546.0 filed Dec. 20, 2007. The contents of which are hereby incorporated by reference in their entirety.

TECHNICAL FIELD

The present invention relates to a method and an apparatus for operating a hybrid vehicle, in particular a hybrid vehicle comprising a start/stop automatic, and a hybrid vehicle designed accordingly.

BACKGROUND

Modern hybrid vehicles, which have both an internal combustion engine and an electric motor for powering the vehicle, often comprise a start/stop automatic by means of which the internal combustion engine of the hybrid vehicle is stopped as soon as the hybrid vehicle is standing longer than a predefined time interval in order to thereby save fuel. As soon as the driver subsequently actuates an accelerator pedal of the hybrid vehicle, actuates the clutch, or engages a gear the engine automatically is started up again to further power the hybrid vehicle. Furthermore, it is common practice in modern hybrid vehicles that the internal combustion engine of the hybrid vehicle is started automatically under certain conditions, in particular when the hybrid vehicle detects that the charging condition of its battery is below a predefined threshold value.

In hybrid vehicles, in particular in hybrid vehicles comprising a start/stop automatic for the internal combustion engine, also in a case where the hybrid vehicle is parked and independent of whether a driver of the hybrid vehicle is present or not an automatic startup of the internal combustion engine may occur. In particular this happens when the so called readiness to drive or readiness for operation of the hybrid vehicle has not been disabled and due to a certain condition (e.g. the charging condition of the battery of the hybrid vehicle) the internal combustion engine is activated. On the one hand, by this startup of the internal combustion engine a risk of poisoning is generated when the parked hybrid vehicle resides in a closed room (for example in a garage), and on the other hand an uncontrolled driving of the hybrid vehicle by a third party, for example by children playing in the hybrid vehicle, is possible.

It is known from DE 102 11 463 A1 to monitor the status of the engine hood of the vehicle in a hybrid vehicle and in case that an opening of the engine hood has been detected to inhibit a startup of the internal combustion engine. However, this approach is associated with the problem that in the so called readiness to drive or electric mode in which the internal combustion engine has not yet been started the vehicle may break down in case of a defective engine hood sensor since in that case no startup of the internal combustion engine is possible.

SUMMARY

According to various embodiments, the risk potential resulting from the previously mentioned circumstances can be reduced.

According to an embodiment, in a method for operating a hybrid vehicle, wherein the hybrid vehicle comprises an internal combustion engine and an electric motor for powering the hybrid vehicle, the presence of a driver of the hybrid vehicle in the hybrid vehicle is monitored, and in a readiness to drive mode of the hybrid vehicle the internal combustion engine is started automatically in case it is detected that the driver is not present in the hybrid vehicle.

According to a further embodiment, the automatic startup of the internal combustion engine in the readiness to drive mode of the hybrid vehicle can be carried out depending on the position of a shift control lever for a gearbox of the hybrid vehicle. According to a further embodiment, the method may only be carried out when a shift control lever of an automatic gearbox of the hybrid vehicle is in a position "P" or "N". According to a further embodiment, the internal combustion engine may be started automatically in the readiness to drive mode of the hybrid vehicle as soon as it is no longer detected that the driver is present in the hybrid vehicle and the shift control lever is in position "P", and the internal combustion engine, when the shift control lever is in position "N", only may be started automatically when it is detected that the driver is present in the hybrid vehicle. According to a further embodiment, the internal combustion engine may be started automatically in the readiness to drive mode of the hybrid vehicle as soon as it is no longer detected that the driver is present in the hybrid vehicle and the shift control lever is in position "N", and the internal combustion engine, when the shift control lever is in position "P", may only be started automatically when it is detected that the driver is present in the hybrid vehicle. According to a further embodiment, it can be detected that the driver is present in the hybrid vehicle when a brake of the hybrid vehicle is actuated. According to a further embodiment, the internal combustion engine may be stopped automatically in case the readiness to drive mode of the hybrid vehicle is left.

According to another embodiment, an apparatus for operating a hybrid vehicle comprising an internal combustion engine and an electric motor for powering the hybrid vehicle, may further comprise starting means for automatically starting up the internal combustion engine, wherein the apparatus comprises monitoring means for monitoring the presence of a driver of the hybrid vehicle in the hybrid vehicle, and the apparatus is arranged such that the starting means start the internal combustion engine automatically in a readiness to drive mode of the hybrid vehicle when the monitoring means detect that the driver is not present in the hybrid vehicle.

According to a further embodiment of the apparatus, the apparatus may be arranged for carrying out the method as described above.

According to yet another embodiment, a hybrid vehicle may comprise an internal combustion engine and an electric motor for powering the hybrid vehicle and may comprise an apparatus as described above.

BRIEF DESCRIPTION OF THE DRAWINGS

In the following the present invention is described in more detail by means of an embodiment and with reference to the drawing.

FIG. 1 schematically depicts a hybrid vehicle according to various embodiments.

DETAILED DESCRIPTION

In line with various embodiments a method for operating a hybrid vehicle is provided, wherein the internal combustion engine is started automatically in the readiness to drive or readiness for operation mode of the hybrid vehicle when it cannot longer be detected assuredly that the driver is present in the hybrid vehicle.

The presence of the driver in the hybrid vehicle may be monitored by means of sensors applicable accordingly, wherein in particular so called intrinsically safe sensors may be used which can detect the presence of the driver in the hybrid vehicle with a high reliability. An example of such an intrinsically safe sensor is the brake or the gearbox shift control lever. If, for example, the brake pedal of the hybrid vehicle is actuated, it may be reliably assumed that the driver is located in the hybrid vehicle.

As in the first version according to various embodiments the internal combustion engine is started automatically as soon as one cannot longer be sure that the driver resides in the hybrid vehicle, the driver, for example when leaving the hybrid vehicle, is warned by the then starting internal combustion engine so that the driver then can react accordingly by for example transferring the hybrid vehicle into a status in which the hybrid vehicle does not anymore start the internal combustion engine automatically.

Thus, according to various embodiments, a risk of poisoning emanating from the internal combustion engine starting automatically in the readiness to drive mode and the risk that children playing in the hybrid vehicle set the hybrid vehicle in motion unintentionally when the driver already has left the hybrid vehicle are reduced significantly, since the driver is pointed towards these risks by the automatically starting internal combustion engine. Thereby, an uncontrolled startup of the internal combustion engine is avoided in most cases and a damage to the environment caused by an unnoticed engine start and a pollutant emission related thereto is avoided.

Known as the readiness to drive of the hybrid vehicle here also is a status of the hybrid vehicle identified as an electric mode in which as a general rule the internal combustion engine does not run, however, the electric motor is in a status corresponding to an activated ignition in a common vehicle, so that by means of an actuation of the accelerator pedal of the hybrid vehicle a drive torque may be exerted on the hybrid vehicle by the electric motor.

In a hybrid vehicle comprising an automatic gearbox the method according to an embodiment is only carried out in case a shift control lever of this automatic gearbox is in a position P (for parking the hybrid vehicle and for fixing the gearbox, respectively) or N (neutral and idle, respectively, i.e. no actuation).

In other words, this is to mean that according to this embodiment the internal combustion engine only then is started automatically in the readiness to drive mode as soon as it is no longer detected reliably that the driver is present in the hybrid vehicle when the automatic gearbox is in the position P or in the position N.

In a further embodiment the internal combustion engine is started automatically when the shift control lever is in the position P as soon as in the readiness to drive mode of the hybrid vehicle it is not detected anymore that the driver resides in the hybrid vehicle. Furthermore, in this further embodiment a startup of the internal combustion engine with a shift control lever in position N never is possible without an explicit intrinsically safe startup request of the driver, this is to mean the internal combustion engine may only be started in the shift control lever position N when it is detected that the driver is present in the hybrid vehicle.

In another embodiment the behavior is exactly inverted. This is to mean in this embodiment, when the shift control lever is in the position N, the internal combustion engine is started automatically as soon as in the readiness to drive mode of the hybrid vehicle it is not detected anymore that the driver is present in the hybrid vehicle, while a startup of the internal combustion engine with a shift control lever in a position P never is possible without an explicit intrinsically safe startup request of the driver, i.e. the internal combustion engine may only be started with a shift control lever in a position P when it is detected that the driver is present in the hybrid vehicle.

Thus, it may be advantageously differentiated between the position P and the position N since in the case of the one position of the shift control lever the internal combustion engine may only then be started automatically when it is detected that the driver resides in the hybrid vehicle, while in the case of the other shift control lever position the internal combustion engine immediately is started automatically in the readiness to drive mode of the hybrid vehicle as soon as it is no longer detected that the driver resides in the hybrid vehicle.

In line with various embodiments also an apparatus for operating a hybrid vehicle comprising an internal combustion engine is provided. In doing so, the apparatus comprises starting means for starting the internal combustion engine automatically, and monitoring means which detect the presence of the driver in the hybrid vehicle. The apparatus is arranged such that in the readiness to drive mode of the hybrid vehicle the starting means start the internal combustion engine automatically (or do not stop it when the internal combustion engine already is running) as soon as it is no longer detected by the monitoring means that the driver is present within the hybrid vehicle.

According to an embodiment, the apparatus furthermore is arranged such that the starting means only then start the internal combustion engine during a presence of the driver in the hybrid vehicle when an explicit intrinsically safe startup request of the driver is present.

In line with various embodiments there is also proposed a hybrid vehicle which comprises the apparatus.

The various embodiments are also suited for being applied to hybrid vehicles which are arranged such that it is preferably avoided that a charging condition of a battery of the hybrid vehicle falls below a predefined threshold value. Of course, the present invention is not limited to this preferred range of application but may for example also be applied to hybrid vehicles comprising a start/stop automatic that makes sure that the internal combustion engine of the hybrid vehicle is turned off as soon as the hybrid vehicle is standing for more than on second, for example, and by which the internal combustion engine then is started automatically as soon as the accelerator pedal of the hybrid vehicle then standing more than one second is actuated.

The various embodiments are also suited for being applied to hybrid vehicles comprising a manual gearbox. In a hybrid vehicle comprising a manual gearbox the previously described method, according to an embodiment, only then is carried out when a shift control lever of this manual gearbox is in a non-engaging position or a disengaged position, which may be detected by means of an idle switch, for example, or when the vehicle is in a parking position, which may be detected by means of a parking brake sensor, for example.

Depicted in the sole FIGURE is a hybrid vehicle 1 which, besides an apparatus 9 according to various embodiments, comprises an internal combustion engine 4, an electric motor 5, a brake 6, a shift control lever 7 for an automatic gearbox (not depicted) of the hybrid vehicle 1 and a battery 8 for operating the electric motor 5. The apparatus 9 according to various embodiments on its part comprises starting means 2 in order to start the electric motor 5 or the internal combustion engine 4, and monitoring means 3, in order to monitor and detect, respectively, an actuation of the brake 6, a position of the shift control lever 7 and a charging condition of the battery 8.

When, for example, the readiness to drive or the readiness for operation of the hybrid vehicle 1 has been activated by means of a start/stop button (not shown) of the hybrid vehicle 1 or by means of another operating element, the hybrid vehicle 1 preferably is moved by means of the electric motor 5 and otherwise by means of the internal combustion engine 4 as the driver, just like in common motor vehicles only provided with an internal combustion engine, actuates an accelerator pedal (not shown) of the hybrid vehicle 1. The hybrid vehicle 1 is designed such that as a result of the startup of the internal combustion engine the battery 8 is always charged when the readiness to drive mode is active and the monitoring means 3 detect that the charging condition of the battery 8 has fallen below a predefined threshold value. Furthermore, the hybrid vehicle 1 comprises a start/stop automatic of such a type that the internal combustion engine 4, in case it is actually running, is stopped when the hybrid vehicle 1 stands for a certain unit of time, preferably more than one second, in order to thereby save fuel, for example when waiting at a red traffic light. When the internal combustion engine 4 has been stopped by the start/stop automatic, this start/stop automatic takes care that the internal combustion engine 4 is started again solely by an actuation of the accelerator pedal of the hybrid vehicle 1 when the accelerator pedal has been actuated such that the driver request communicated thereby cannot be satisfied exclusively by means of the driving force of the electric motor 5. Thus, the internal combustion engine 2 typically always is started in case when a target torque requested by the driver is above a maximum torque delivered by the electric motor 3.

When the driver now stops the hybrid vehicle 1 and moves the shift control lever 7 into the position P (or N, respectively) then the internal combustion engine 4 is stopped at latest one second after standstill of the hybrid vehicle 1. When the driver leaves the hybrid vehicle 1 without previously deactivating the readiness to drive or the readiness for operation of the hybrid vehicle 1 by means of the start/stop button the monitoring means 3 detect that the driver no longer resides in the hybrid vehicle 1 and as soon as they have detected this automatically start the internal combustion engine 4. As a result of the start of the internal combustion engine 4 the driver is advised that the readiness for operation of the hybrid vehicle 1 is still activated. By means of this alert, as a general rule, the driver will disable the readiness for operation of the hybrid vehicle 1 by means of the start/stop button so that an automatic startup of the internal combustion engine 4 and the risks associated therewith are inhibited.

In contrast, when the driver puts the shift control lever 7 into the position N (or P, respectively) when stopping the hybrid vehicle 1 and leaves the hybrid vehicle 1, the monitoring means 3 detect that the driver no longer resides in the hybrid vehicle 1. When now the charging condition of the battery 8 falls below the predefined threshold value while in this status (driver does not reside in vehicle 1) the internal combustion engine 4 nevertheless is not started since the monitoring means 3 have detected that the driver does not reside in the hybrid vehicle 1, whereby an automatic startup of the internal combustion engine 4 is avoided. Advantageously it is thereby avoided that due to the exhaust gases of the automatically started internal combustion engine 4 a risk of poisoning is caused when the driver has parked the hybrid vehicle 1 in a garage, for example, whereby a protection against a dead space ventilation (poisoning by exhaust gases) is warranted. In other words, the internal combustion engine 4 in this status has to be started explicitly by means of an intrinsically safe startup request of the driver, for example by way of the driver actuating the accelerator pedal, in order to assure that in this status a startup of the internal combustion engine only is carried out during a presence of the driver in the vehicle.

When the readiness to drive mode is terminated by the user, for example by actuating the start/stop button or another suitable operating element, the internal combustion engine 2 again is automatically stopped by the apparatus 9 and the start/stop automatic coupled with the starting means 2, respectively.

REFERENCE NUMERALS 1 hybrid vehicle
2 starting means
3 monitoring means
4 internal combustion engine
5 electric motor
6 brake
7 gearbox shift control lever
8 battery
9 apparatus

What is claimed is:

1. A method for operating a hybrid vehicle, wherein the hybrid vehicle comprises an internal combustion engine, an electric motor for powering the hybrid vehicle, and a shift control lever for a gearbox of the hybrid vehicle, the method comprising:
monitoring the presence of a driver of the hybrid vehicle in the hybrid vehicle, and
while the hybrid vehicle is in a readiness to drive mode:
starting the internal combustion engine automatically in response to detecting that the driver is not present in the hybrid vehicle and the shift control lever is in position "P", and
not starting the internal combustion engine automatically in response to detecting that the driver is not present in the hybrid vehicle and the shift control lever is in position "N".

2. The method according to claim 1, wherein it is detected that the driver is present in the hybrid vehicle when a brake of the hybrid vehicle is actuated.

3. The method according to claim 1, wherein the internal combustion engine is stopped automatically in case the readiness to drive mode of the hybrid vehicle is left.

4. An apparatus for controlling an automatic starting of a hybrid vehicle comprising an internal combustion engine and an electric motor for powering the hybrid vehicle, a shift control device for a gearbox of the hybrid vehicle, and monitoring means for monitoring the presence of a driver of the hybrid vehicle in the hybrid vehicle,
wherein the apparatus is configured to, in a readiness to drive mode of the hybrid vehicle:
automatically start the internal combustion engine in response to detecting that the driver is not present in the hybrid vehicle and the shift control device is in position "P", and
not automatically start the internal combustion engine in response to detecting that the driver is not present in the hybrid vehicle and the shift control device is in position "N".

5. The apparatus according to claim 4, wherein the apparatus is operable to detect that the driver is present in the hybrid vehicle when a brake of the hybrid vehicle is actuated.

6. The apparatus according to claim 4, wherein the apparatus is further operable to stop the internal combustion engine automatically in case the readiness to drive mode of the hybrid vehicle is left.

7. A hybrid vehicle comprising:
an internal combustion engine,
an electric motor for powering the hybrid vehicle,
a shift control device for a gearbox of the hybrid vehicle, and monitoring means for monitoring the presence of a driver of the hybrid vehicle in the hybrid vehicle, and
a control apparatus configured to, in a readiness to drive mode of the hybrid vehicle:
    automatically start the internal combustion engine in response to detecting that the driver is not present in the hybrid vehicle and the shift control device is in position "P", and
    not automatically start the internal combustion engine in response to detecting that the driver is not present in the hybrid vehicle and the shift control device is in position "N".

8. The hybrid vehicle according to claim 7, wherein the apparatus is operable to detect that the driver is present in the hybrid vehicle when a brake of the hybrid vehicle is actuated.

9. The hybrid vehicle according to claim 7, wherein the apparatus is further operable to stop the internal combustion engine automatically in case the readiness to drive mode of the hybrid vehicle is left.

10. A method for operating a hybrid vehicle, wherein the hybrid vehicle comprises an internal combustion engine, an electric motor for powering the hybrid vehicle, and a shift control lever for a gearbox of the hybrid vehicle, the method comprising:
monitoring the presence of a driver of the hybrid vehicle in the hybrid vehicle, and
in a readiness to drive mode of the hybrid vehicle:
    starting the internal combustion engine automatically in response to detecting that the driver is not present in the hybrid vehicle and the shift control lever is in position "N", and
    not starting the internal combustion engine automatically in response to detecting that the driver is not present in the hybrid vehicle and the shift control lever is in position "P".

11. An apparatus for controlling an automatic starting of a hybrid vehicle comprising an internal combustion engine and an electric motor for powering the hybrid vehicle, a shift control device for a gearbox of the hybrid vehicle, and monitoring means for monitoring the presence of a driver of the hybrid vehicle in the hybrid vehicle,
wherein the apparatus is configured to, in a readiness to drive mode of the hybrid vehicle:
    automatically start the internal combustion engine in response to detecting that the driver is not present in the hybrid vehicle and the shift control device is in position "N", and
    not automatically start the internal combustion engine in response to detecting that the driver is not present in the hybrid vehicle and the shift control device is in position "P".

12. A hybrid vehicle comprising:
an internal combustion engine,
an electric motor for powering the hybrid vehicle,
a shift control device for a gearbox of the hybrid vehicle, and monitoring means for monitoring the presence of a driver of the hybrid vehicle in the hybrid vehicle, and
a control apparatus configured to, in a readiness to drive mode of the hybrid vehicle:
    automatically start the internal combustion engine in response to detecting that the driver is not present in the hybrid vehicle and the shift control device is in position "N", and
    not automatically start the internal combustion engine in response to detecting that the driver is not present in the hybrid vehicle and the shift control device is in position "P".

* * * * *